US009106081B2

(12) United States Patent
Arai

(10) Patent No.: US 9,106,081 B2
(45) Date of Patent: Aug. 11, 2015

(54) SECONDARY CELL PROTECTION CIRCUIT AND BATTERY

(75) Inventor: Kuniaki Arai, Tokyo (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 353 days.

(21) Appl. No.: 13/578,781

(22) PCT Filed: Feb. 15, 2011

(86) PCT No.: PCT/JP2011/053602
§ 371 (c)(1),
(2), (4) Date: Aug. 13, 2012

(87) PCT Pub. No.: WO2011/105309
PCT Pub. Date: Sep. 1, 2011

(65) Prior Publication Data
US 2012/0306451 A1     Dec. 6, 2012

(30) Foreign Application Priority Data

Feb. 26, 2010   (JP) .................................. 2010-041385

(51) Int. Cl.
*H02J 7/00* (2006.01)
*H01M 10/42* (2006.01)

(52) U.S. Cl.
CPC ........... *H02J 7/0026* (2013.01); *H01M 10/425* (2013.01); *H02J 7/0016* (2013.01); *H01M 2200/00* (2013.01)

(58) Field of Classification Search
CPC ..... H02J 7/0031; H02J 2007/004; H02J 7/14; Y02E 60/12; H01M 10/441

USPC .................................................. 320/134, 162
See application file for complete search history.

(56) References Cited

U.S. PATENT DOCUMENTS

| 5,547,775 | A | * | 8/1996 | Eguchi et al. .................. 320/118 |
| 6,771,049 | B2 | * | 8/2004 | Kawagoe et al. .............. 320/136 |
| 6,867,567 | B2 |   | 3/2005 | Yokota et al. |
| 7,928,691 | B2 | * | 4/2011 | Studyvin et al. .............. 320/116 |
| 2002/0024319 | A1 | | 2/2002 | Haraguchi et al. |
| 2006/0103351 | A1 | | 5/2006 | Tanigawa et al. |

(Continued)

FOREIGN PATENT DOCUMENTS

| EP | 0729185 A2 | 8/1996 |
| JP | 5-49181 | 2/1993 |

(Continued)

OTHER PUBLICATIONS

European Search Report dated Dec. 13, 2012 in corresponding European patent application No. 11 74 7270.4.

(Continued)

*Primary Examiner* — Leigh Garbowaki
(74) *Attorney, Agent, or Firm* — Cooper & Dunham LLP

(57) ABSTRACT

A secondary cell protection circuit configured to protect plural secondary cells connected in series is disclosed that includes plural switching parts configured to be connected in parallel with the secondary cells respectively; and a charge controller configured to turn on the switching part connected to the secondary cell of which cell voltage is greater than or equal to a return voltage, and to turn off the switching part when all cell voltages of the secondary cells become greater than or equal to the return voltage, when the secondary cells are being charged.

14 Claims, 2 Drawing Sheets

(56) References Cited

U.S. PATENT DOCUMENTS

| | | |
|---|---|---|
| 2007/0145951 A1 | 6/2007 | Hidaka et al. |
| 2008/0258683 A1 | 10/2008 | Chang |
| 2009/0224726 A1 | 9/2009 | Arai |
| 2010/0019725 A1 | 1/2010 | Nakatsuji |

FOREIGN PATENT DOCUMENTS

| | | | | |
|---|---|---|---|---|
| JP | 2001-268817 | | 9/2001 | |
| JP | 2002-078218 | | 3/2002 | |
| JP | 2006-338995 | | 12/2006 | |
| JP | 3863031 | | 12/2006 | |
| JP | 2008-154317 | | 7/2008 | |
| JP | 2008-278688 | | 11/2008 | |
| JP | 2009-71052 | | 4/2009 | |
| JP | 2009-131060 | * | 6/2009 | ........ H02J 7/02 |
| JP | 2009-213329 | | 9/2009 | |
| JP | 2010-68618 | | 3/2010 | |
| JP | 2011-62033 | | 3/2011 | |
| JP | 2011-62034 | | 3/2011 | |
| JP | 2011-176930 | | 9/2011 | |

OTHER PUBLICATIONS

International Search Report Issued May 24, 2011 in PCT/JP2011/053602.

Written Opinion in PCT/JP2011/053602.

* cited by examiner

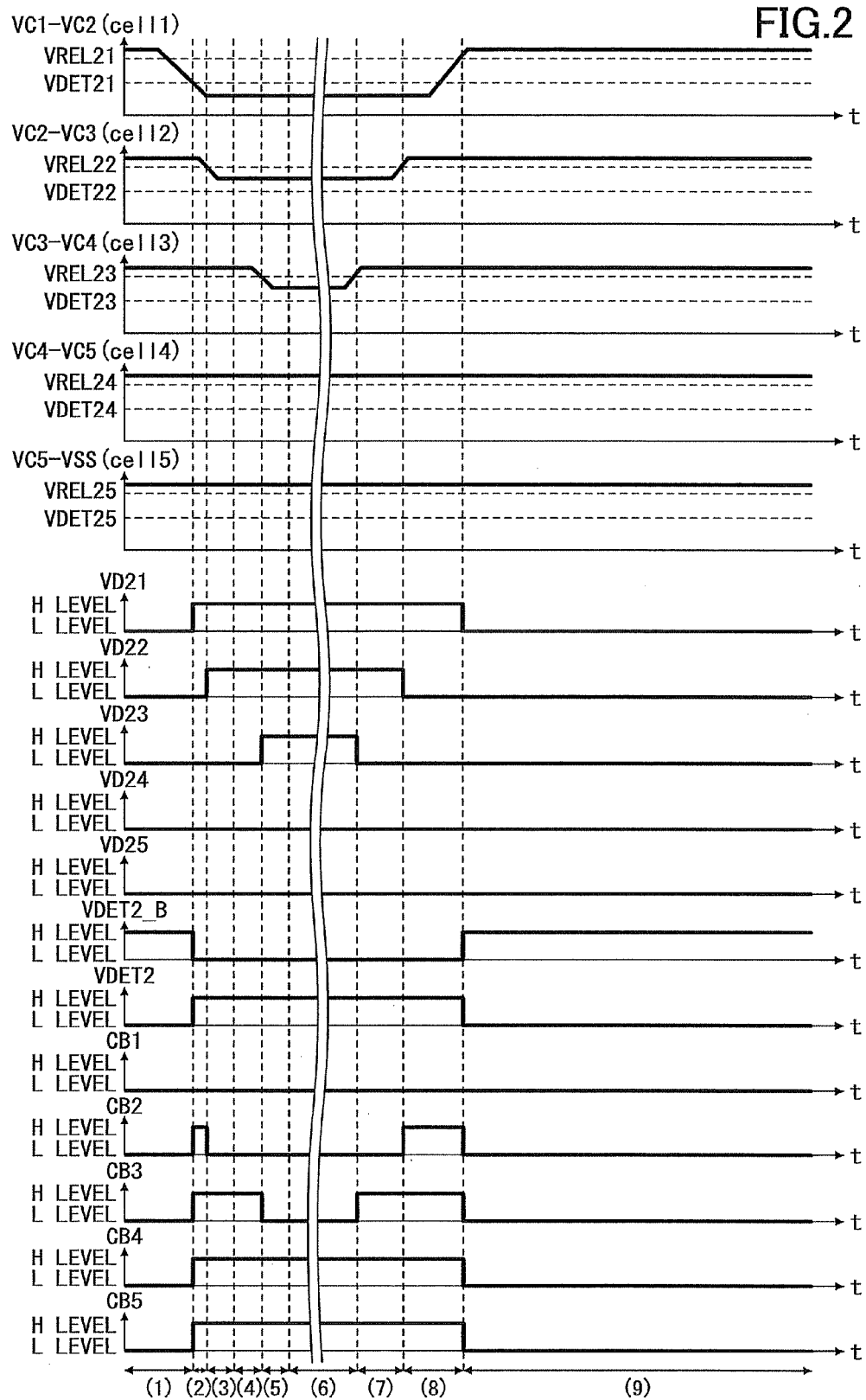

SECONDARY CELL PROTECTION CIRCUIT AND BATTERY

TECHNICAL FIELD

The present invention generally relates to a technique which is used for protecting a lithium-ion battery or the like, that is included in a battery pack of a secondary cell, from overcharge, over discharge, short circuit current or the like. The battery pack of a secondary cell, hereinafter referred to as a battery, is used for a voltage regulator or a voltage detector of a composite-type power supply IC which has plural delay time, and particularly for a portable electronic device or the like. The present invention particularly relates to a technique which is suitable for use in suppressing voltage variability of the battery, which is constituted of plural cells connected to each other in series in order to boost output voltage thereof, on a full charge.

BACKGROUND ART

Patent document 1 (for example, Japanese Patent No. 3863031) discloses a technique for monitoring a state of a battery, which is constituted of plural secondary cells connected to each other in series in order to boost output voltage thereof, when the battery is being charged and discharged. Patent document 1 discloses a technique which prevents an occurrence of a mode in that voltage of the battery can not be supplied to a load by cancelling a charge inhibit signal, in a case where the charge inhibit signal is input to a microcomputer when overcurrent is detected.

Patent document 2 (for example, Japanese Patent Laid-Open Publication No. 2008-278688) discloses a protection circuit which keeps cell balance when battery voltage becomes greater than a predetermined voltage. According to this technique, it is possible to keep the cell balance when the battery voltage becomes greater than the predetermined voltage.

Herein, a technique for keeping the cell balance is a technique in that variability of amount of charge of each cell included in a battery is corrected. The variability of amount of charge is caused by variability of discharge rate of each cell. It is necessary to correct the cell balance particularly for a large battery in which a number of cells are connected to each other in series.

According to the technique disclosed in patent document 2, each cell includes an over discharge detecting circuit which detects over discharge of the cell, an overcharge detecting circuit which detects overcharge of the cell and a controller which controls turning on/off of a switch that is connected to the cell in parallel. In Order to keep the cell balance, the controller turns on the switch based on a detection result of the overcharge detecting circuit when the battery is being charged. When the battery is being discharged, the overcharge detecting circuit and the controller are turned off based on detection result of the over discharge detecting circuit in order to keep the cell balance by decreasing power consumption and thereby decreasing discharge rate of the cell.

In a case where battery voltages of the cells include variability, and then battery voltage of one of the cells decreases and becomes less than over discharge detect voltage faster than battery voltages of other cells, a state monitoring circuit of the battery detects decrease of battery voltage of the cell and discharge of the cell is suspended based on detection result of the state monitoring circuit of the battery. In this condition, power consumption of the cell becomes lower than other cells, and thus discharge rate of the cell becomes slower than other cells. Since other cells are discharged normally, it becomes possible to keep the cell balance between the cell and other cells.

On the contrary, in a case where battery voltages of the cells include variability, and then battery voltage of one of the cells increases and becomes greater than predetermined cell balance voltage faster than battery voltages of other cells, the switch which is connected in parallel to the cell is turned on. Then the cell is discharged, and it becomes possible to keep the cell balance.

According to the technique as described above, each cell includes the over discharge detecting circuit which detects over discharge, the overcharge detecting circuit which detects overcharge and the controller which controls turning on/off of the switch that is connected in parallel to the cell. In order to keep the cell balance, the controller turns on the switch based on the detection result of the overcharge detecting circuit when the battery is being charged. When the battery is being discharged, the overcharge detecting circuit and the controller are turned off based on detection result of the over discharge detecting circuit in order to keep the cell balance by decreasing power consumption and thereby decreasing discharge rate of the cell.

When over discharge of a cell is detected, the controller does not control turning on/off of the switch, and the overcharge detecting circuit and the controller are turned off. Then the power consumption is reduced and the discharge rate of the cell is decreased in order to keep the cell balance. In this condition, it is not possible to increase discharge rate of other cells in a positive manner.

Since the switches are controlled to be turned on/off independently for each cell, the problem described above is caused.

Since the switches are controlled to be turned on/off independently for each cell, it is not possible to keep the cell balance in a manner that all of the switches are turned on/off relative to one another, when the cells are discharged and charged.

According to the technique described above, the cell balance can be kept by switching the switches only when the battery is being charged, since the switches are controlled to be turned on/off independently for each cell. Thus, there is a problem in that it is not possible to keep the cell balance by switching the switches when the battery is being discharged. There is another problem in that it is not possible to keep the cell balance in a manner that all of the switches are turned on/off relative to one another, when the cells are discharged and charged.

SUMMARY OF THE INVENTION

It is a general object of the present invention to provide a secondary cell protection circuit and a battery that can enhance efficiency of keeping cell balance by shortening amount of time necessary for fully charging cells. Further, it is a general object of the present invention to provide a secondary cell protection circuit and a battery that controls cell balance based on at least one of cell voltages.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a secondary cell protection circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a secondary cell protection circuit configured to protect plural secondary cells connected in series including: plural switching parts configured to be connected in parallel with the secondary cells respectively; and a charge controller configured to turn on the switching part connected to the secondary cell of which cell voltage is greater than or equal to a return voltage, and to turn off the switching part when all cell voltages of the secondary cells become greater than or equal to the return voltage, when the secondary cells are being charged.

Another embodiment of the present invention provides a secondary cell protection circuit configured to protect plural secondary cells connected in series including: plural switching parts configured to be connected in parallel with the secondary cells respectively; plural over discharge detecting parts configured to detect an over discharge state of the secondary cells respectively; an over discharge detection signal outputting part configured to output an over discharge detection signal when any of the plural over discharge detecting parts detect the over discharge state; a discharge controller configured to form a discharge path by turning on the switching part in order to discharge the secondary cell, which is not in the over discharge state, via the discharge path when the over discharge detection signal outputting part outputs the over discharge detection signal; a charge controller configured to turn on the switching part connected to the secondary cell of which cell voltage is greater than or equal to a return voltage, and to turn off the switching part when all cell voltages of the secondary cells become greater than or equal to the return voltage, when the secondary cells are being charged; wherein the over discharge detecting parts respectively detect the over discharge state when the cell voltage becomes less than a detection voltage, and the return voltage is greater than or equal to the detection voltage.

Other objects, features and advantages of the present invention will become more apparent from the following detailed description when read in conjunction with the accompanying drawings.

BRIEF DESCRIPTION OF THE DRAWINGS

FIG. 2 shows a timing chart indicating an operation of the secondary cell protection circuit 100 and a battery 200 according to the present embodiment.

DESCRIPTION OF EMBODIMENTS

Figure 1:
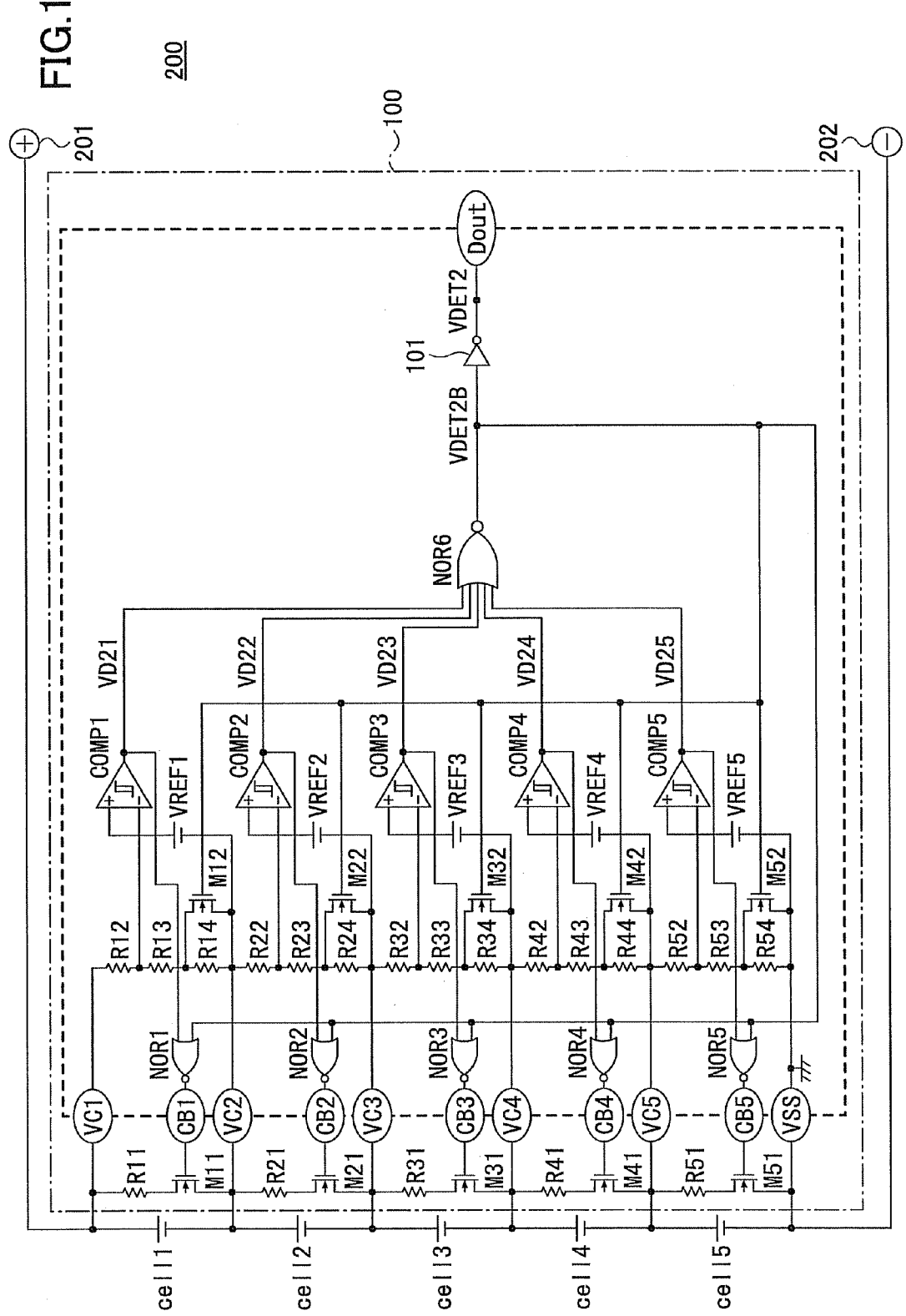
FIG. 1 is a schematic drawing showing an example of a secondary cell protection circuit 100 and a battery 200 according to the present embodiment.

In the following, embodiments of the present invention will be described with reference to the accompanying drawings.

FIG. 1 is a schematic drawing showing an example of a secondary cell protection circuit 100 and a battery 200 according to the present embodiment. FIG. 1 shows only a portion of the secondary cell protection circuit 100 and the battery 200 that are related to the present embodiment. The battery 200 includes the secondary cell protection circuit 100, a cell 1, a cell 2, a cell 3, a cell 4, a cell 5, a terminal 201 and a terminal 202. The secondary cell protection circuit 100 is indicated by the alternate long and short dash line. The secondary cell protection circuit 100 includes resistors R11~R14, R21~R24, R31~R34, R41~R44, R51~R54, transistors (NMOS) M11, M12, M21, M22, M31, M32, M41, M42, M51, M52, negative OR circuits (NOR circuits) NOR1~NOR6, an inverter 101, comparators COMP1~COMP5, cell terminals VC1~VC5, VSS, switch control terminals CB1~CB5, reference power sources VREF1~VREF5 and a terminal Dout. A portion of the secondary cell protection circuit 100 included in the dotted line indicates a portion which is constituted of an IC. The secondary cell protection circuit 100 may be connected to a battery which is included in notebook-size personal computer and includes plural secondary cells connected to each other in series.

When the cells 1~5 are being charged, the secondary cell protection circuit 100 turns on transistor(s), among the transistors M11~M51, that is connected to cell(s), among the cells 1~5, of which cell voltage becomes greater than or equal to a predetermined return voltage. When all of the cell voltages of the cells 1~5 becomes greater than or equal to the return voltage, the secondary cell protection circuit 100 turns off the transistors M11~M51. Thus, it is possible to suppress variability of the cell voltages on a full charge.

When the secondary cell protection circuit 100 detects over discharge of the cells 1~5 which is connected to each other in series, the NOR circuit NOR6 outputs an over discharge detection signal VDET2B which is used for suspending discharge of the cells 1~5. The over discharge detection signal VDET2B is input to the inverter 101, and inverted to an over discharge detection signal VDET2. The over discharge detection signal VDET2 is output from the terminal Dout.

The transistors M11, M21, M31, M41 and M51 constitute switching parts, and are connected in parallel to the cells 1~5, respectively.

The comparators COMP1~COMP5, the resistors R11~R54, reference power sources VREF1~VREF5 and NOR circuit NOR6 constitute an over discharge detecting part. The over discharge detecting part outputs the over discharge detection signal from the NOR circuit NOR6 when at least one of the cells 1~5 becomes in an over discharge state in that the cell voltage becomes less than or equal to a predetermined detection voltage VDET, in a condition where a load is connected between the terminal 201 and the terminal 202.

Hereinafter, for example, a case where the cell 1 becomes in the over discharge state and the cells 2~5 do not become in the over discharge state will be described.

The comparators COMP1~COMP5 and NOR circuits NOR1~NOR6 constitute a discharge controller. When the NOR circuit NOR6 outputs the discharge detection signal VDET2B, the discharge controller does not turn on the transistor M11 that is connected to the cell 1. The discharge controller turns on rest of transistor M21~M51 that is connected to rest of the cells 2~5. The cells 2~5 are discharged via discharge paths that include the resistors R21~R51 and the transistors M21~M51 respectively.

The comparators COMP1~COMP5 and the NOR circuits NOR1~NOR6 constitute charge controller. The charge controller turns on the transistor M21~M51 which corresponds to the cells 2~5 when the cells 1~5 are being charged via the terminals 201 and 202. The charge controller turns on the transistor M21~M51 until all of the cell voltages of the cells 1~5 become greater than or equal to the return voltage VREL which is greater than or equal to the detection voltage VDET.

The transistors M11, M21, M31, M41 and M51 constitute the switching parts, and are connected in parallel to the cells 1~5, respectively. The comparators COMP1~COMP5, the resistors R11~R54 and the reference power sources VREF1~VREF5 respectively constitute an over discharge detecting part. The comparators COMP1~COMP5, the resistors R11~R54 and the reference power sources VREF1~VREF5, as the over discharge detecting parts, detect the over discharge state of the cells 1~5 respectively and independently when the load is connected between the terminal 201 and the terminal 202. In the over discharge state, the cell voltage becomes less than or equal to the detection voltage VDET.

The NOR circuit NOR6 constitutes the over discharge detection signal outputting part and outputs the over discharge detection signal when at least one of the over discharge detecting parts detects the over discharge state. The over discharge detecting parts are constituted of the comparators COMP1~COMP5, the resistors R11~R54 and the reference power sources VREF1~VREF5. The comparators COMP1~COMP5 and NOR circuits NOR1~NOR6 constitute a discharge controller. When the NOR circuit NOR6 outputs the discharge detection signal VDET2B, the discharge controller does not turn on the transistor M11 that is connected to the cell 1. The discharge controller turns on rest of transistor M21~M51 that is connected to rest of the cells 2~5. The cells 2~5 are discharged via discharge paths that include the resistors R21~R51 and the transistors M21~M51 respectively.

The comparators COMP1~COMP5 and the NOR circuits NOR1~NOR6 constitute the charge controller. When the cells 1~5 are being charged via the terminals 201 and 202, the charge controller turns on the transistor M21~M51 which corresponds to the cells 2~5 when the cells 1~5 are being charged via the terminals 201 and 202. The charge controller turns on the transistor M21~M51 until all of the cell voltages of the cells 1~5 become greater than or equal to the return voltage VREL which is greater than or equal to the detection voltage VDET.

The transistors M11, M21, M31, M41 and M51 constitute the switching parts, and are connected in parallel to the cells 1~5, respectively. The comparators COMP1~COMP5, the resistors R11~R54 and the reference power sources VREF1~VREF5 respectively constitute an over discharge detecting part. The comparators COMP1~COMP5, the resistors R11~R54 and the reference power sources VREF1~VREF5, as the over discharge detecting parts, detect the over discharge state of the cells 1~5 respectively and independently when the load is connected between the terminal 201 and the terminal 202. In the over discharge state, the cell voltage becomes less than or equal to the detection voltage VDET.

The NOR circuit NOR6 constitutes the over discharge detection signal outputting part and outputs the over discharge detection signal when at least one of the over discharge detecting parts detects the over discharge state. The over discharge detecting parts are constituted of the comparators COMP1~COMP5, the resistors R11~R54 and the reference power sources VREF1~VREF5. The resistors R12~R14, R22~R24, R32~R34, R42~R44 and R52~R54 and the transistors M12, M22, M32, M42 and M52 constitute a detection level shifting part. When the NOR circuit NOR6 outputs the over discharge detection signal VDET2B, the detection level shifting part shifts detection voltages of the over discharge detecting parts, which corresponds to the cells 2~5, to the return voltage VREL which is greater than or equal to the detection voltage VDET.

The comparators COMP1~COMP5 and the NOR circuits NOR1~NOR6 constitute discharge controller. When the NOR circuit NOR6 outputs the discharge detection signal VDET2B, the discharge controller does not turn on the transistor M11 that is connected to the cell 1. The discharge controller turns on rest of transistor M21~M51 that is connected to rest of the cells 2~5. The cells 2~5 are discharged via discharge paths that include the resistors R21~R51 and the transistors M21~M51 respectively. The comparators COMP1~COMP5, the resistors R11~R54 and the reference power sources VREF1~VREF5 respectively constitute the over discharge detecting part. When the over discharge detecting parts detect the over discharge state of the cells 2~5, the transistors M21, M31, M41 and M51 are turned off, and the discharge paths that cause the cells 2~5 to discharge are shut off. In the over discharge state, cell voltages of the cells 2~5 become less than or equal to the return voltage VREL which is shifted by the detection level shifting part. The resistors R12~R14, R22~R24, R32~R34, R42~R44 and R52~R54 and the transistors M12, M22, M32, M42 and M52 constitute the detection level shifting part.

The comparators COMP1~COMP5 and the NOR circuits NOR1~NOR6 constitute the charge controller. When the cells 1~5 are being charged via the terminals 201 and 202, the charge controller turns on the transistor M21~M51 which corresponds to the cells 2~5 when the cells 1~5 are being charged via the terminals 201 and 202. The charge controller turns on the transistor M21~M51 until all of the cell voltages of the cells 1~5 become greater than or equal to the return voltage VREL which is greater than or equal to the detection voltage VDET.

As described above, the transistors M11, M21, M31, M41 and M51 are connected in parallel to the cells 1~5, respectively. The secondary cell protection circuit 100 turns on/off the transistors M11, M21, M31, M41 and M51 respectively, in accordance with variations of cell voltage(s) of another cell(s). Accordingly, the secondary cell protection circuit 100 makes it possible to keep the cell balance, by turning on/off the transistors M11~M51, not only when the cells are being charged, but also when the cells are being discharged.

Thus, it becomes possible to increase the discharge rate of the cells 2~5 other than the cell 1 which becomes in the over discharge state. Accordingly, it becomes possible to accomplish the cell balance more efficiently when the cells are being discharged.

Further, the resistors R12~R14, R22~R24, R32~R34, R42~R44 and R52~R54 and the transistors M12, M22, M32, M42 and M52 constitute the detection level shifting parts that shift the detection voltage. Thus, it becomes possible to control and keep the cell balance by shifting the detection voltage based on the cell voltage of any one of the cells 1~5.

Although, a case in that the cell 1 becomes in the over discharge state and the cells 2~5 do not become in the over discharge state is described above, the same applies to a case in that any of the cells 1~5 become in the over discharge state and other cell(s) does not become in the over discharge state.

Hereinafter, a detailed configuration and an operation of the secondary cell protection circuit 100 will be described with reference to FIG. 1. FIG. 1 shows only a portion of the secondary cell protection circuit 100 and the battery 200 that are related to the present embodiment.

At first, the comparators COMP1~COMP5, the detection voltage VDET and the return voltage VREL will be described.

Inverting levels of the comparators COMP1~COMP5 become levels as described below, in a case where an output of the NOR circuit NOR6 becomes in High level (VDET2B=H) and the transistors M12, M22, M32, M42 and M52 are being turned on. The comparators COMP1~COMP5 include hysteresis characteristics. Hysteresis operation of the comparators COMP1~COMP5 are switched by the transistors M12, M22, M32, M42 and M52. The inverting levels of the comparators COMP1~COMP5, in this condition, constitute over discharge detection levels (detection voltages).

An inverting level VDET21 (detection voltage) of the comparator COMP1 is obtained from a following formula.

VDET21=VREF1×(R12+R13)/R13

An inverting level VDET22 (detection voltage) of the comparator COMP2 is obtained from a following formula.

VDET22=VREF2×(R22+R23)/R23

An inverting level VDET23 (detection voltage) of the comparator COMPS is obtained from a following formula.

VDET23=VREF3×(R32+R33)/R33

An inverting level VDET24 (detection voltage) of the comparator COMP4 is obtained from a following formula.

VDET24=VREF4×(R42+R43)/R43

An inverting level VDET25 (detection voltage) of the comparator COMP5 is obtained from a following formula.

VDET25=VREF5×(R52+R53)/R53

Inverting levels of the comparators COMP1~COMP5 become levels as described below, in a case where the output of the NOR circuit NOR6 becomes in Low level (VDET2B=L) and the transistors M12, M22, M32, M42 and M52 are being turned off. Inverting levels of the comparators COMP1~COMP5, in this condition, constitute return levels (return voltages). Inverting level VREL21 (return voltage) of the comparator COMP1 is obtained from a following formula.

VREL21=VREF1×(R12+R13+R14)/(R13+R14)

Inverting level VREL22 (return voltage) of the comparator COMP2 is obtained from a following formula.

VREL22=VREF2×(R22+R23+R24)/(R23+R24)

Inverting level VREL23 (return voltage) of the comparator COMP3 is obtained from a following formula.

VREL23=VREF3×(R32+R33+R34)/(R33+R34)

Inverting level VREL24 (return voltage) of the comparator COMPO is obtained from a following formula.

VREL24=VREF4×(R42+R43+R44)/(R43+R44)

Inverting level VREL25 (return voltage) of the comparator COMP5 is obtained from a following formula.

VREL25=VREF5×(R52+R53+R54)/(R53+R54)

In the next, an operation of a returning operation from the over discharge state will be described.

For example, a case where only the cell voltage of the cell 1 begins to decrease when all of the cell voltages of the cells 1~5 are greater than or equal to the return levels (return voltages) will be described.

When all of the cell voltages of the cells 1~5 are greater than or equal to the return levels (return voltages), the output of the NOR circuit NOR6 becomes in High level (VDET2B=H) and the transistors M12, M22, M32, M42 and M52 are being turned on.

In this condition, as the cell voltage of the cell 1 decreases and input voltage of an inverting input (an input to the minus terminal) of the comparator COMP1 becomes less than VREF1, an output signal VD21 of the comparator COMP1 turns from L level to H level. The input voltage of the inverting input of the comparator COMP1 is divided by the resistors R12 and R13.

The output signal VD21 is input to the NOR circuit NOR6, and then the over discharge detection signal VDET2B which is output from the NOR circuit NOR6 turns from H level to L level. The over discharge detection signal VDET2B is input to the inverter 101, and then the over discharge detection signal VDET2 which is output from the inverter 101 turns from L level to H level. Thus, the over discharge of the cell 1 is detected, and then the over discharge detection signal of H level is output from the terminal Dout. Herein, the over discharge detection signal of H level means that the over discharge is detected.

Herein, the transistors M12, M22, M32, M42 and M52 are turned off, since the over discharge detection signal VDET2B turns from H level to L level.

Therefore, the input voltage of an inverting input (the input to the minus terminal) of the comparator COMP1 increases, and then the hysteresis characteristics that makes the output signal VD21 of the comparator COMP1 even harder to return to L level is obtained.

In the next, an operation of the secondary cell protection circuit 100 in that the cell voltage of the cell 1 begins to increase from the condition as described above will be described.

As the cell voltage of the cell 1 increases and input voltage of an inverting input (the input to the minus terminal) of the comparator COMP1 becomes greater than or equal to VREF1, the output signal VD21 of the comparator COMP1 turns from H level to L level. The input voltage of the inverting input of the comparator COMP1 is divided by the resistors R12, R13 and R14.

The output signal VD21 is input to the NOR circuit NOR6, and then the over discharge detection signal VDET2B which is output from the NOR circuit NOR6 turns from L level to H level. The over discharge detection signal VDET2B is input to the inverter 101, and then the over discharge detection signal VDET2 which is output from the inverter 101 turns from H level to L level. Thus, the cell 1 is returned from the over discharge state, and then the over discharge detection signal of L level is output from the terminal Dout. Herein, the over discharge detection signal of L level means that the over discharge is not detected.

Herein, the transistors M12, M22, M32, M42 and M52 are turned on, since the over discharge detection signal VDET2B turns from L level to H level.

Therefore, the input voltage of an inverting input (the input to the minus terminal) of the comparator COMP1 decreases, and then the hysteresis characteristics that makes the output signal VD21 of the comparator COMP1 even harder to return to H level is obtained.

The secondary cell protection circuit 100 keeps the cell balance by turning on/off the transistors M12, M22, M32, M42 and M52 at the earlier stage of charging the cell 1 during the returning operation from the over discharge state.

Although, a case in that the cell 1 becomes in the over discharge state and the cells 2~5 do not become in the over discharge state is described above, the same applies to a case in that any of the cells 1~5 become in the over discharge state and other cell(s) does not become in the over discharge state.

In the following, the operation of the secondary cell protection circuit 100 will be described with reference to FIG. 2.

In the first period (1) as shown in FIG. 2, the output signals VD21, VD22, VD23, VD24 and VD25 are in L level, since all of the cell voltages of the cells 1~5 are greater than the over discharge detection levels (detection voltages VDET21, VDET22, VDET23, VDET 24 and VDET 25). In this condition, the output of the NOR circuit NOR6 are in H level (VDET2B=H) and the transistors M12, M22, M32, M42 and M52 are being turned on. Thus, the inverting levels of the comparators COMP1~COMP5 are set to be VDET21, VDET22, VDET23, VDET24 and VDET25, respectively.

In the second period (2), the output signal VD21 becomes in H level, since the cell voltage of the cell 1 becomes less than the level of the over discharge detection signal VDET2 (detection voltage). Thus, the output of the NOR circuit NOR6 becomes in L level (VDET2B=L), and the transistors M12, M22, M32, M42 and M52 are turned off. Therefore, the inverting level of the comparators COMP1~COMP5 becomes in VREL21, VREL22, VREL23, VREL24 and VREL 25.

Since the cell voltages of the cells 2~5 are respectively greater than VREL22, VREL23, VREL24 and VREL 25, the output signals VD22, VD23, VD24 and VD25 are in L level. Since the output of the NOR circuit NOR6 is in L level (VDET2B=L), respective output signals CB2, CB3, CB4 and CB5 of the NOR circuits NOR2, NOR3, NOR4 and NOR5 become in H level.

As the output signals CB2, CB3, CB4 and CB5 become in H level, the transistors M21, M31, M41 and M51 are turned on. Thus the discharge paths of the cells 2~5 are formed. The discharge paths are used for keeping the cell balance and for allowing charging current to flow out. In the second period (2), the cell voltage of the cell 2 is decreasing.

In the third period (3), the output signal VD22 becomes in H level, since the cell voltage of the cell 2 becomes less than the inverting level VREL22. Thus, the output signal CB2 becomes in L level, and the transistor M21 is turned off. Therefore, the discharge path which is connected in parallel with the cell 2 is shut off, and then the discharge of the cell 2 is stopped.

In the fourth period (4), the cell voltage of the cell 3 begins to decrease by being discharged.

In the fifth period (5), the output signal VD23 becomes in H level, since the cell voltage of the cell 3 becomes less than the inverting level VREL23. Thus, the output signal CB3 becomes in L level, and the transistor M31 is turned off. Therefore, the discharge path which is connected in parallel with the cell 3 is shut off, and then the discharge of the cell 3 is stopped.

As described above, the discharges of the cells 2 and 3 are stopped respectively when the cell voltages of the cells 2 and 3 become equal to the inverting levels VREL22 and VREL23. The inverting levels VREL22 and VREL23 are higher than the inverting level VDET21 (detection voltage) of cell 1. The discharges of the cells 2 and 3 are operated in order to keep the cell balance. Thus, it becomes possible to shorten the amount of time which is necessary to fully charge the cells.

In the sixth period (6), similar operations that are performed with regard to the cells 2 and 3 are performed with regard to the cells 4 and 5. Thus the detailed operations of the cells 4 and 5 are omitted, and a charge operation will be described hereinbelow.

In the seventh period (7), the cell voltage of the cell 3 increases and becomes greater than the inverting level VREL23, since charge operation of the cell 3 is started in the sixth period (6). Thus, the output signal VD23 becomes in L level. Then, the output signal CB3 becomes in H level, and the transistor M31 is turned on. Therefore, the discharge path which is connected in parallel with the cell 3 is formed.

In the eighth period (8), the output signal VD22 becomes in H level, since the cell voltage of the cell 2 becomes greater than the inverting level VREL22. Thus, the output signal CB2 becomes in H level, and the transistor M21 is turned on. Therefore, the discharge path which is connected in parallel with the cell 2 is formed.

Accordingly, it becomes possible to suppress a further increase of the cell voltages of the cells 2 and 3 in the seventh and eighth periods (7) and (8) by forming the discharge paths that are connected in parallel with the cells 2 and 3. Thus, it becomes possible to control and suppress overcharge of the cells 2 and 3.

Herein, in the sixth period (6), similar operations, for controlling and suppressing the overcharge, that are performed with regard to the cells 2 and 3 are performed with regard to the cells 4 and 5.

In the ninth period (9), the output signal VD21 becomes in L level, since the cell voltage of the cell 1 becomes greater than the inverting level VREL21.

At this stage, since all of the cell voltages of the cells 1~5 are greater than the inverting levels VREL21, VREL22, VREL23, VREL24 and VREL25, the output of the NOR circuit NOR6 becomes in High level (VDET2B=H).

Since the output of the NOR circuit NOR6 becomes in High level (VDET2B=H), the respective output signals CB2, CB3, CB4 and CB5 of the NOR circuits NOR2, NOR3, NOR4 and NOR5 become in L level. Thus, the transistors M21, M31, M41 and M51 are turned off, and then the discharge paths that are connected in parallel with the cells 2~5, respectively, are shut off.

According to the present embodiment, when the over discharge of at least one of the cells is detected, the rest of the cell(s) of which the cell voltage(s) is greater than or equal to the return voltage is discharged by corresponding transistor (s) among M11, M21, M31, M41 and M51.

When at least one of the cells is being charged from the over discharge state, all of the cell voltages of the cells are balanced at around the return voltage. Then all of the cells are begun to be fully charged. Thus, it becomes possible to suppress the variability of the cell voltages on a full charge.

As shown in FIGS. 1 and 2, the secondary cell protection circuit 100 protects plural secondary cells 1~5 connected in series. The secondary cell protection circuit 100 includes the plural switching parts (the transistors M11, M21, M31, M41, M51) and the charge controller (the comparators COMP1~COMP5 and the NOR circuits NOR1~NOR6). The plural switching parts (the transistors M11, M21, M31, M41, M51) are connected in parallel with the secondary cells (cells 1~5) respectively. The charge controller (the comparators COMP1~COMP5 and the NOR circuits NOR1~NOR6) turns on the switching part connected to the secondary cell of which cell voltage is greater than or equal to the return voltage. The charge controller turns off the switching part when all cell voltages of the secondary cells become greater than or equal to the return voltage, when the secondary cells are being charged.

The secondary cell protection circuit 100 includes the plural switching parts (the transistors M11, M21, M31, M41, M51), the plural over discharge detecting parts (the comparators COMP1~COMP5 and the NOR circuits NOR1~NOR6), the over discharge detection signal outputting part(the NOR circuit NOR6), the detection level shifting part (the resistors R12~R14, R22~R24, R32~R34, R42~R44 and R52~R54 and the transistors M12, M22, M32, M42 and M52), the discharge controller (the comparators COMP1~COMP5 and the NOR circuits NOR1~NOR6) and the charge controller (the comparators COMP1~COMP5 and the NOR circuits NOR1~NOR6). The plural switching parts (the transistors M11, M21, M31, M41, M51) are connected in parallel with the secondary cells (cells 1~5) respectively. The plural over discharge detecting parts (the comparators COMP1~COMP5 and the NOR circuits NOR1~NOR6) detect the over discharge state of the secondary cells respectively. The over discharge detection signal outputting part (the NOR circuit NOR6) outputs the over discharge detection signal when any of the plural over discharge detecting parts detect the over discharge state. The detection level shifting part (the resistors R12~R14, R22~R24, R32~R34, R42~R44 and R52~R54 and the transistors M12, M22, M32, M42 and M52) shifts detection voltages of the over discharge detecting part which does not detect the over discharge state to the return voltage when the over discharge detection signal outputting part outputs the over discharge detection signal. The discharge controller (the comparators COMP1~COMP5 and the NOR circuits NOR1~NOR6) forms the discharge path by turning on the switching part in order to discharge the secondary cell, which is not in the over discharge state, via the discharge path when the over discharge detection signal outputting part outputs the over discharge detection signal. The charge controller (the comparators COMP1~COMP5 and the NOR circuits NOR1~NOR6) turns on the switching part connected to the secondary cell of which cell voltage is greater than or equal to the return voltage, and to turn off the switching part when all cell voltages of the secondary cells become greater than or equal to the return voltage, when the secondary cells are being charged. The over discharge detecting parts (the comparators COMP1~COMP5 and the NOR circuits NOR1~NOR6) respectively detect the over discharge state when the cell voltage becomes less than the detection voltage, and the return voltage is greater than or equal to the detection voltage. When any of the over discharge detecting parts (the comparators COMP1~COMP5 and the NOR circuits NOR1~NOR6) detect the over discharge state of the cell by detecting that the cell voltage becomes less than or equal to the detection voltage which is shifted to the return voltage by the detection level shifting part, the discharge controller shuts off the discharge path by turning off the switching part corresponding to the cell of which the over discharge state is detected by the over discharge detecting part.

According to the present embodiment, the secondary cell protection circuit 100 controls and links a discharge monitoring part which monitors discharge state of each cell, a charge monitoring part which monitors charging state of each cell and a switching part which controls discharge path. Thus, it becomes possible to keep the cell balance of plural cells based on at least one of the cell voltage.

For example, when the secondary cell protection circuit 100 charges the cells in a condition where at least one of the cells is in the over discharge state, the secondary cell protection circuit 100 balances all of the cell voltages of the cells at around the return voltage before fully charging all of the cells. Thus, it becomes possible to suppress the variability of cell voltages on a full charge. When the over discharge state of one of the cells is detected and the discharge path(s) are formed with regard to the rest of the cell(s), the secondary cell protection circuit 100 shifts the inverting levels from VDET to VREL. Thus, it becomes possible to shorten the amount of time necessary for fully charging the cells, while keeping the cell balance. Particularly, it becomes possible to shorten the amount of time necessary for fully charging the cells that are not in the over discharge state.

The present invention is not limited to the embodiments as described above and as shown in FIGS. 1 and 2. For example, the number of cell may be changed from five to three or four. The battery 200 may include at least two cells.

It becomes possible to provide the battery 200 which has enhanced charge performance by including the secondary cell protection circuit 100 thereinto.

The present invention is not limited to the specifically disclosed embodiments, and variations and modifications may be made without departing from the scope of the present invention.

The present application is based on Japanese priority application No. 2010-041385 filed on Feb. 26, 2010 with the Japanese Patent Office, the entire contents of which are hereby incorporated herein by reference.

The invention claimed is:

1. A secondary cell protection circuit configured to protect plural secondary cells connected in series comprising:
   plural switching parts configured to be connected in parallel with the secondary cells respectively; and
   a charge controller configured to turn on the switching part connected to the secondary cell of which cell voltage is greater than or equal to a return voltage, and to turn off the switching part when all cell voltages of the secondary cells become greater than or equal to the return voltage,
   wherein the return voltage is less than the voltage of a fully charged secondary cell.

2. The secondary cell protection circuit as claimed in claim 1, further comprising:
   an over discharge detecting part configured to detect an over discharge state of any of the secondary cells; and
   a discharge controller configured to form a discharge path by turning on the switching part in order to discharge the secondary cell, which is not in the over discharge state, via the discharge path when the over discharge detecting part detects the over discharge state of any of the secondary cells;
   wherein the over discharge detecting part detects the over discharge state when the cell voltage becomes less than a detection voltage.

3. A battery comprising:
   a plurality of secondary cells; and
   the secondary cell protection circuit as claimed in claim 2.

4. A battery comprising:
   a plurality of secondary cells; and
   the secondary cell protection circuit as claimed in claim 1.

5. The secondary cell protection circuit as claimed in claim 1, wherein the charge controller includes:
   a plurality of comparators to which reference voltages and voltages based on the cell voltage are input, respectively,
   a first NOR circuit to which outputs of the comparators are input, and
   a second NOR circuit to which an output of the first NOR circuit and the outputs of the comparators are input.

6. The secondary cell protection circuit as claimed in claim 1, wherein the discharge controller includes:
   a plurality of comparators to which reference voltages and voltages based on the cell voltage are input, respectively,
   a first NOR circuit to which outputs of the comparators are input, and
   a second NOR circuit to which an output of the first NOR circuit and the outputs of the comparators are input.

7. A secondary cell protection circuit configured to protect plural secondary cells connected in series comprising:
   plural switching parts configured to be connected in parallel with the secondary cells respectively;
   plural over discharge detecting parts configured to detect an over discharge state of the secondary cells respectively;
   an over discharge detection signal outputting part configured to output an over discharge detection signal when any of the plural over discharge detecting parts detect the over discharge state;

a discharge controller configured to form a discharge path by turning on the switching part in order to discharge the secondary cell, which is not in the over discharge state, via the discharge path when the over discharge detection signal outputting part outputs the over discharge detection signal;

a charge controller configured to turn on the switching part connected to the secondary cell of which cell voltage is greater than or equal to a return voltage, and to turn off the switching part when all cell voltages of the secondary cells become greater than or equal to the return voltage, when the secondary cells are being charged;

wherein the over discharge detecting parts respectively detect the over discharge state when the cell voltage becomes less than a detection voltage, and wherein the return voltage is greater than or equal to the detection voltage and less than the voltage of a fully charged secondary cell.

8. The secondary cell protection circuit as claimed in claim 7, further comprising:

a detection level shifting part configured to shift detection voltage of the over discharge detecting part which does not detect the over discharge state to the return voltage when the over discharge detection signal outputting part outputs the over discharge detection signal;

wherein, when any of the over discharge detecting parts detect the over discharge state of the cell by detecting that the cell voltage becomes less than or equal to the detection voltage which is shifted to the return voltage by the detection level shifting part, the discharge controller shuts off the discharge path by turning off the switching part corresponding to the cell of which the over discharge state is detected by the over discharge detecting part.

9. A battery comprising:
a plurality of secondary cells; and
the secondary cell protection circuit as claimed in claim 8.

10. A battery comprising:
a plurality of secondary cells; and
the secondary cell protection circuit as claimed in claim 7.

11. The secondary cell protection circuit as claimed in claim 7, wherein the charge controller includes:
a plurality of comparators to which reference voltages and voltages based on the cell voltage are input, respectively,
a first NOR circuit to which outputs of the comparators are input, and
a second NOR circuit to which an output of the first NOR circuit and the outputs of the comparators are input.

12. The secondary cell protection circuit as claimed in claim 7, wherein the discharge controller includes:
a plurality of comparators to which reference voltages and voltages based on the cell voltage are input, respectively,
a first NOR circuit to which outputs of the comparators are input, and
a second NOR circuit to which an output of the first NOR circuit and the outputs of the comparators are input.

13. A secondary cell protection circuit configured to protect plural secondary cells connected in series comprising:

plural switching parts configured to be connected in parallel with the secondary cells respectively;

plural over discharge detecting parts configured to detect an over discharge state of the secondary cells respectively;

an over discharge detection signal outputting part configured to output an over discharge detection signal when any of the plural over discharge detecting parts detect the over discharge state;

a discharge controller configured to form a discharge path by turning on the switching part in order to discharge the secondary cell, which is not in the over discharge state, via the discharge path when the over discharge detection signal outputting part outputs the over discharge detection signal;

a charge controller configured to turn on the switching part connected to the secondary cell of which cell voltage is greater than or equal to a return voltage, and to turn off the switching part when all cell voltages of the secondary cells become greater than or equal to the return voltage, when the secondary cells are being charged; and a detection level shifting part configured to shift detection voltage of the over discharge detecting part which does not detect the over discharge state to the return voltage when the over discharge detection signal outputting part outputs the over discharge detection signal, wherein the over discharge detecting parts respectively detect the over discharge state when the cell voltage becomes less than a detection voltage, and the return voltage is greater than or equal to the detection voltage; and wherein, when any of the over discharge detecting parts detect the over discharge state of the cell by detecting that the cell voltage becomes less than or equal to the detection voltage which is shifted to the return voltage by the detection level shifting part, the discharge controller shuts off the discharge path by turning off the switching part corresponding to the cell of which the over discharge state is detected by the over discharge detecting part.

14. A battery comprising:
a plurality of secondary cells; and
the secondary cell protection circuit as claimed in claim 13.

* * * * *